Figure 4:
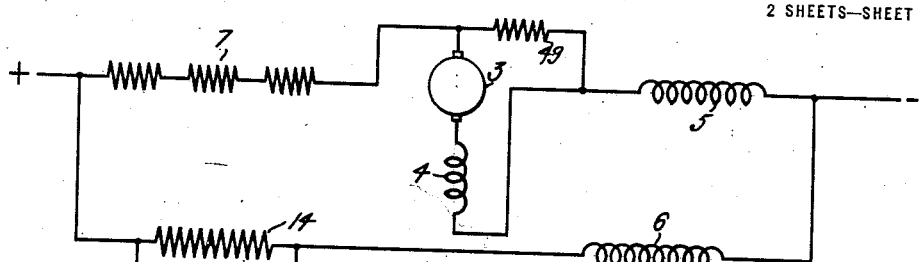

H. L. BEACH.
MOTOR CONTROL SYSTEM.
APPLICATION FILED FEB. 3, 1915.
1,300,238.
Patented Apr. 15, 1919.
2 SHEETS—SHEET 1.
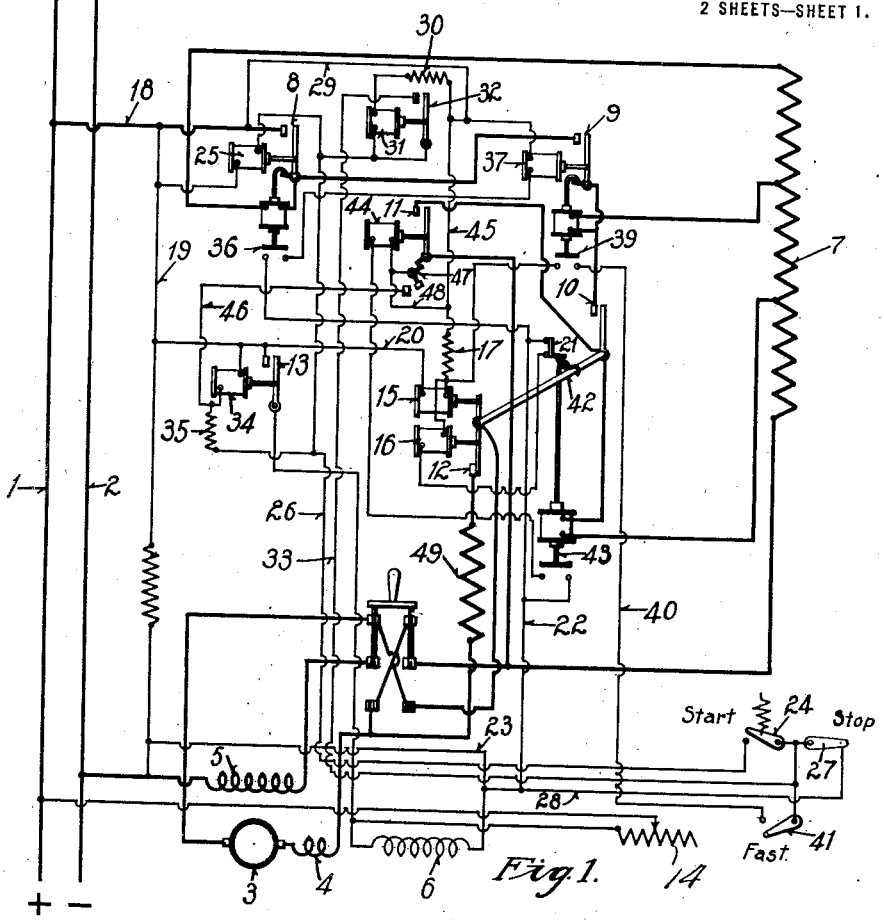
Fig. 1.
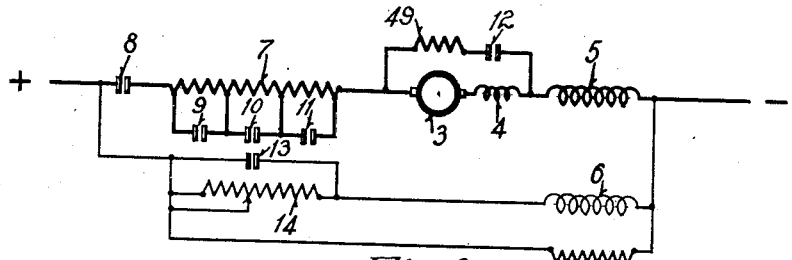
Fig. 2.
Sequence of Switches.
| Sw | For. | | | | 5 On. | 0 | 5 On. | | | Rev. |
|----|------|---|---|---|-------|---|-------|---|---|------|
| 8  | o    | o | o | o | o     |   | o     | o | o | o    |
| 9  | o    | o | o | o |       |   |       | o | o | o    |
| 10 | o    | o | o |   |       |   |       |   | o | o    |
| 11 | o    | o |   |   |       |   |       |   |   | o    |
| 12 |      |   | o | o | o     |   | o     | o | o |      |
| 13 | o    | o | o | o |       |   | o     | o | o | o    |
Fig. 3.
WITNESSES:
R.J. Fitzgerald
J.R. Langley
INVENTOR
Howard L. Beach.
BY
Wiley G. Carr
ATTORNEY

UNITED STATES PATENT OFFICE.

HOWARD L. BEACH, OF EDGEWOOD PARK, PENNSYLVANIA, ASSIGNOR TO WESTINGHOUSE ELECTRIC AND MANUFACTURING COMPANY, A CORPORATION OF PENNSYLVANIA.

MOTOR-CONTROL SYSTEM.

1,300,238.  Specification of Letters Patent.  Patented Apr. 15, 1919.

Application filed February 3, 1915. Serial No. 5,896.

*To all whom it may concern:*

Be it known that I, HOWARD L. BEACH, a citizen of the United States, and a resident of Edgewood Park, in the county of Allegheny and State of Pennsylvania, have invented a new and useful Improvement in Motor-Control Systems, of which the following is a specification.

My invention relates to motor-control systems, and it has particular reference to such systems as are employed in connection with hoists, machine tools and similar machines.

My invention has for its object to provide a simple arrangement whereby an electric motor may be operated at substantially uniform speeds under varying loads by controlling the armature current and accurate stops and reversals may thereby be secured.

In the operation of elevators, hoists and machine tools, in which frequent stops and reversals are necessary, it is desirable to obtain operating conditions whereby the moving parts may always be brought to a stop at the end of a definite and uniform extent of travel after the controller has been brought to the "off" position.

To accomplish the above result, I provide an arrangement by means of which a shunt circuit for dynamic braking is automatically established before the last step of the usual starting resistor has been inserted in circuit with the motor armature. A double-throw switch operates, in one position, to shunt an intermediate section of the resistor and to open the dynamic braking circuit. In its other position, the switch inserts the resistor section in circuit with the motor armature and closes the dynamic braking circuit.

The details of my invention are described in connection with the accompanying drawings in which Figure 1 is a diagrammatic view of circuits and apparatus embodying my invention. Fig. 2 is a view, similar to Fig. 1, of a schematic arrangement of the system of Fig. 1. Fig. 3 is a diagrammatic view illustrating the sequence of the several switches. Figs. 4 to 8, inclusive, are diagrammatic views of the circuits formed through the motor.

Referring particularly to Figs. 1 and 2, line conductors 1 and 2, which may be connected to any suitable source of current, supply energy to an electric motor 3 having a compensating field magnet winding 4, a series field winding 5 and a shunt field magnet winding 6. A starting resistor 7 of the usual sectional type is in series with the motor armature. A main switch 8 controls the connection of the motor to the line conductor 1. The starting resistor 7 is controlled by a series of progressively actuated electromagnetic switches 9, 10 and 11 which operate, according to their positions, to remove sections of the starting resistor from, or insert them into, the motor circuit.

The dynamic braking circuit for the motor is controlled by an electromagnetic switch 12 which is mechanically connected to the switch 10 to form a double-throw switch. An electromagnetic switch 13 controls a shunt circuit for a resistor 14 that is in series with the shunt field magnet winding 6.

The double-throw switch, comprising the switches 10 and 12, is controlled by magnet coils 15 and 16 which operate, according as the one or the other exerts the stronger force, to close the switch 10 and open the switch 12, or to close the switch 12 and open the switch 10. The coil 16 is designed to operate when the voltage applied to its terminals is approximately one-half that normally necessary for the operation of the coil 15. For example, if the coil 15 be adapted for operation at 230 volts, the coil 16 operates at 115 volts.

A resistor 17 is connected in shunt relation to the coil 15 and its resistance is so arranged that the total resistance of the parallel circuit comprising it and the coil 15, is substantially equal to the resistance of the coil 16. Thus, when the coils 15 and 16 are in series relation, the voltages applied to the terminals of the respective coils will be equal. The coil 16 will, in such cases, predominate because the voltage applied to the terminals 15 is only one-half its normal value. When the coil 16 is shunted, full voltage is applied to the coil 15, and the switches 10 and 12 are actuated in the opposite direction.

Normally, the switch 12 is closed by a circuit which extends from the positive line conductor 1 through conductors 18, 19 and 20, coils 15 and 16, switch 21 and conductors 22 and 23 to the negative line conductor 2. A shunt circuit for the coil 15 extends from the conductor 18 through the resistor 17, To start the motor, a switch 24, which may be a push button located at any convenient point, is temporarily closed by the operator. Current then traverses a circuit extending from the line conductor 1 through the conductor 18, coil 25 of switch 8, conductor 26, switch 24, switch 27, which is closed, and conductors 28 and 23 to line conductor 2. Current also flows from the conductor 18 through conductor 29, resistor 30, coil 31 of relay switch 32, conductor 26 and then as above traced.

The switch 8 is thereby actuated to close the motor circuit through the entire starting resistor 7. Current also traverses the shunt circuit for the motor armature controlled by the switch 12. The relay switch 32 closes to complete a circuit which extends from the conductor 18 through the coil 25, switch 32, conductor 33, switch 27 and conductors 28 and 23 to line conductor 2. This circuit connects the several controlling switches to the line conductor 1 after the starting button 24 has been released by the operator.

The closing of the switch 24 operates, also, to complete a circuit which extends from the line conductor 1 through conductors 18 and 19, coil 34 of switch 13, resistor 35, conductor 26 and thence to the line conductor 2, as traced above in connection with switch 8. The switch 13 is thus closed simultaneously with the switch 8 to shunt the field resistor 14 and thereby insure a strong magnetic field in starting. The circuit formed through the motor is illustrated in Fig. 4 of the drawing.

Figure 5:
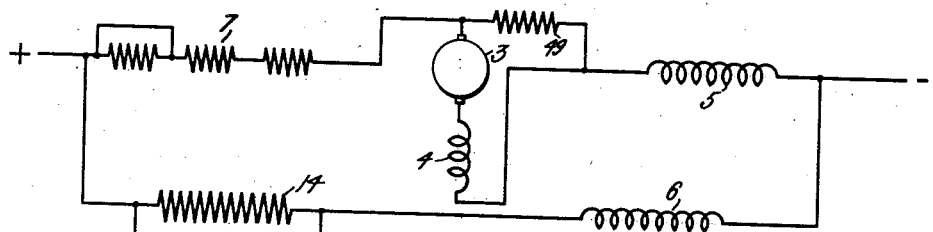

The closing of the switch 8 operates to permit the closing of a relay switch 36 which controls the circuit of the magnet coil 37 of the switch 9. The coil 37 is energized by a circuit which extends from the conductor 18, which is connected to the line conductor 1, through a conductor 29, coil 37, relay switch 36 and conductors 22 and 23 to the line conductor 1. The closing of the switch 9 operates to shunt a section of the starting resistor 7, as is illustrated in Fig. 5 of the drawing. The switch 9 also operates to permit the closing of a relay switch 39 which establishes a shunt circuit for the coil 16. This shunt circuit extends from one terminal of the coil 16, through the relay switch 39, conductor 40, switch 41, switch 27, conductors 28 and 22 and switch 21 to the other terminal of the coil 16.

Figure 6:
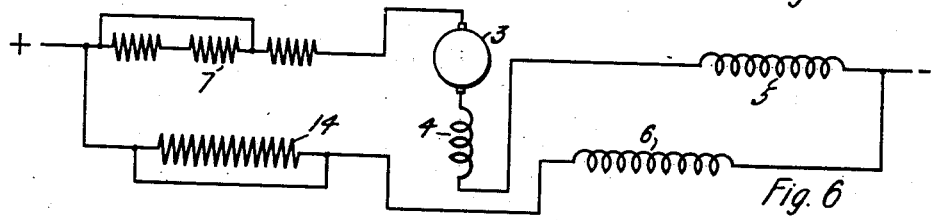

The coil 16, which operates as a holding coil to maintain the closure of the switch 12, is deënergized, and the voltage applied to the coil 15 is increased to that of the line conductors 1 and 2. The coil 15 then operates to simultaneously close the switch 10 and to open the switch 12. The closing of the switch 10 operates to shunt a second section of the starting resistor 7. The opening of the switch 12 opens the shunt circuit for the motor armature, and the motor is further accelerated. The circuit formed through the motor is illustrated in Fig. 6 of the drawing.

Figure 7:
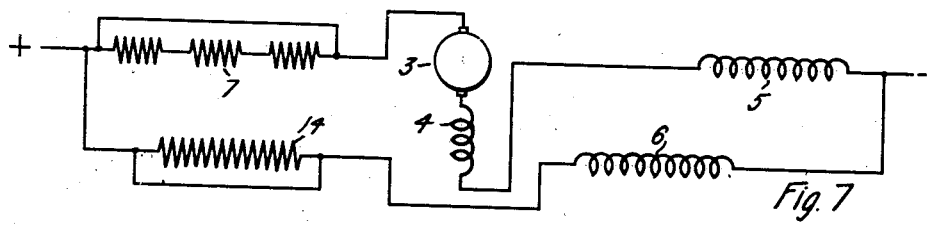

The actuation of a rod 42, which connects the switches 10 and 12, permits the closing of a relay switch 43 which completes a circuit for the magnet coil 44 of the switch 11 extending from the line conductor 1, through conductors 18, 29 and 45, coil 44, relay switch 43 and conductors 22 and 23 to line conductor 2. The switch 11 is thus closed to complete a shunt circuit for the starting resistor, as is illustrated in Fig. 7 of the drawing.

Figure 8:
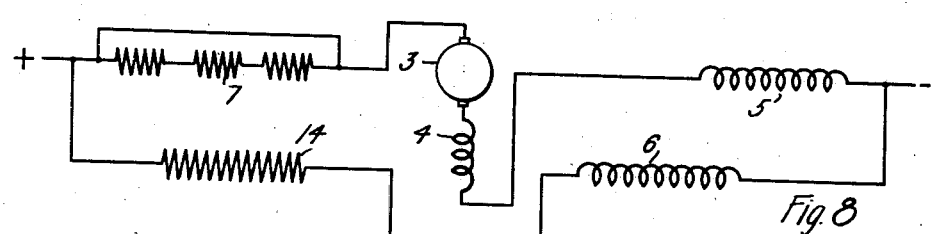

The closing of relay switch 43 operates to open the auxiliary switch 21 which controls the circuit of the coil 16. The switch 11 closes a shunt circuit for the magnet coil 34 of the switch 13 which extends from the lower terminal of coil 34, through conductor 46, auxiliary switch 47, conductors 48, 45, 29, 18 and 19 to the upper terminal of coil 34. The switch 13 then opens a shunt circuit for the field resistor 14, and the motor is further accelerated because of its weakened magnetic field. The motor then operates at normal speed. The circuit formed through the motor is illustrated in Fig. 8 of the drawing.

During operation of the motor and the mechanism to which it is operatively connected, the speed may be controlled by the push button switch 41. When the switch 41 is closed, the motor runs at full speed, under normal conditions. The opening of the switch 41 opens the shunt circuit for the coil 16 and opens the circuit of coil 15. The switch 10 then opens by force of gravity and, when the rod 42 has completed a portion of its movement, the auxiliary switch 21 is again closed. The coils 15 and 16 are thereby connected in series, and the coil 16, which is then the stronger, closes the switch 12 to establish the shunt circuit for the motor armature through the dynamic braking resistor 49.

The switch 21 is necessary, for, if it were omitted, the opening of the shunt circuit for the coil 16 to connect the coils 15 and 16 in series relation would operate to simply insert the resistance of coil 16 in circuit with coil 15. While the force exerted by the latter coil would be reduced, it would probably be sufficient to retain the switch 10 in its closed position because the magnetic circuit of the coil 15 is closed and that of the coil 16 is open. Under such circumstances, it would be impossible to operate the double-throw switch. The switch 21 renders it possible to open the circuit of coil 15 and thereby permit the double-throw switch to equalize magnetic conditions before the series circuit is again completed.

The movement of the rod 42 opens the relay switch 43 which controls the coil 44 of the switch 11, and the latter switch opens to insert a section of the resistor 7 in circuit with the motor armature. The opening of switch 11 opens the auxiliary switch 47 which controls a shunt circuit for the coil 34 of switch 13. The latter switch then closes to establish a shunt circuit for the field resistor 14. The motor then operates at a relatively low speed because of the increased resistance of its armature circuit, the strengthened magnetic field and the shunt around the armature.

The speed of the motor, under the above-described conditions, will be substantially constant for varying loads. When the appropriate switch or the controller, as the case may be, is adjusted to the "off" position, the travel of the mechanism before coming to rest is through a substantially uniform distance. The operator is thus enabled to stop the mechanism at a desired point with a considerable degree of accuracy.

To stop the motor, the switch 27 is opened to break the circuit of the coil 25 of the switch 8. The opening of the switch 8 opens the relay switch 36, and the coil 37 of switch 9 is deënergized thereby. The opening of the switch 27 also opens the circuits of coil 31 of the relay switch 32 and the coil 34 of switch 13, and the latter opens to again insert the resistor 14 in circuit with the shunt field winding. The motor is then brought quickly to rest by the dynamic braking action provided by the circuit comprising the motor armature, resistor 49, switch 12 and field magnet winding 4.

To stop the motor when operating at full speed, it is only necessary to open the switch 27, whereupon the relay switch 32, which connects the control circuits to the line conductor 1, opens the circuits of the coils of the several switches, and dynamic braking conditions are immediately established.

An important feature of the system above described is that the control of the motor to produce the various operating conditions is accomplished entirely by electromagnetic switches having coils that are connected in shunt relation to the motor. The employment of controlling mechanism capable of carrying heavy currents is thereby avoided.

I claim as my invention:

1. In a motor-control system, the combination with a switch, of electro-responsive controlling means therefor, said means comprising a pair of coils disposed in series-circuit relation and adapted for operation at different voltages, and means for shunting one of said coils to effect the operation of said other coil at one of said voltages and for short-circuiting the other of said coils to effect the operation of said one coil at said other voltage.

2. The combination with a double-throw switch, of means for actuating said switch in opposite directions, said means comprising two normally energized coils adapted for operation at different voltages, one only of said coils being normally ineffective and said other coil only being normally effective to actuate said switch, and means for shunting said other coil to render said one coil effective to actuate said switch.

3. The combination with an electric system comprising a plurality of electric circuits, of a double-throw switch for controlling one of said circuits in one of its two positions and another of said circuits in the other of said two positions, two actuating coils for said switch adapted to be energized to different degrees, means for connecting said coils in series to cause one of said coils to actuate said switch to one of said positions, and means for shunting said one coil to cause said other coil to actuate said switch to said other position.

4. In a motor-control system, the combination with a double-throw switch, and two coils for actuating said switch in opposite directions, of means for successively connecting said coils in series relation and energizing them to different degrees, shunting one of said coils, opening the circuit of the one coil, opening the circuit of the other coil and again connecting them in series relation.

5. In a motor-control system, the combination with an electric motor, of a switch having positions corresponding to relatively high and low speeds of said motor, a pair of electromagnets having actuating coils normally connected in series relation for actuating said switch in opposite directions, said electromagnets, when said coils are connected in series relation, operating to bias said switch from a central position to the low-speed position, and means for energizing said coils.

6. The combination with an electric system comprising a plurality of electric circuits, a double-throw switch for completing a circuit of the system in each position thereof, and two actuating coils therefor, one of which is adapted to be excited to a less degree than the other when they are connected in series relation, of means for connecting said coils in series to actuate the switch to one of its operative positions and for shunting one of said coils to effect the movement of the switch to its other operative position.

7. In a motor-control system, the combination with an electric motor, and a plurality of controlling circuits therefor comprising resistors connected in series and in parallel relations with said motor, of a two-position switch for controlling one of said circuits in each position thereof and means for actuating said switch comprising a pair of electromagents one of which is adapted to be excited to a less degree than the other when they are connected in series relation.

8. In a motor-control system, the combination with a double-throw switch, of means comprising two coils disposed in series-circuit relation for actuating said switch in opposite directions, a resistor for shunting one of said coils to effect operation of the switch in one direction, and means for shunting the second coil to effect operation of the switch in a reverse direction.

9. In a motor-control system, the combination with a motor and a source of power therefor, of means for connecting said motor to said source, a double-throw switch for controlling the circuit of said motor when it occupies one position and for controlling an additional dynamic-braking circuit when it occupies another position, and means for causing said switch to assume said two positions, said means comprising two coils adapted for operation at different voltages, one of said coils being ineffective to actuate said switch when both of said coils are energized.

10. In a motor-control system, the combination with a double-throw switch, of two coils in series-circuit relation for actuating said switch in opposite directions, one of said coils being adapted for operation at one half the voltage of said other coil, and a resistor in parallel relation to said other coil, the resistance of the parallel circuit comprising said other coil and said resistor being equal to the resistance of said one coil.

11. In a motor-control system, the combination with a motor having an armature, a resistor in series with said armature and a resistor in parallel with said armature, of a double-throw switch, a pair of coils for actuating said switch in one direction to close the circuit of said parallel resistor when both of said coils are energized and for actuating said switch in the opposite direction to open said circuit and to short-circuit a portion of said series resistor when one of said coils is short-circuited, means for energizing both of said coils, and means controlled by the short-circuiting of a second portion of said series resistor for short-circuiting said one coil.

12. In a motor-control system, the combination with a motor and double-throw switch for controlling the same, of a pair of coils for actuating said double-throw switch, and a switch mechanically connected to said double-throw switch for controlling said coils.

13. In a motor-control system, the combination with a motor having a resistor, of a switch for closing the circuit of said motor, a switch for controlling said resistor, an actuating coil for each of said switches, a switch for simultaneously closing the circuits of said coils, a switch for shunting said third-named switch, and an actuating coil for said fourth-named switch, the circuit of said last-named coil being closed by said third-named switch simultaneously with the closing of said two first-named switches.

In testimony whereof, I have hereunto subscribed my name this 30th day of Jan. 1915.

HOWARD L. BEACH.

Witnesses:
B. B. Hines,
M. C. Merz.